United States Patent
Schafheutle et al.

(10) Patent No.: US 6,429,254 B2
(45) Date of Patent: Aug. 6, 2002

(54) AQUEOUS POLYURETHANE DISPERSIONS CONTAINING POLYBUTADIENE UNITS

(75) Inventors: Markus A. Schafheutle, Graz; Anton Arzt, Neutillitsch; Julius Burkl, Graz; Martina Glettler, Graz; Ursula Meisner, Graz; Gerlinde Petritsch, Graz; Joerg Wango, Wundschuh, all of (AT)

(73) Assignee: Solutia Austria GmbH (AT)

( * ) Notice: Subject to any disclaimer, the term of this patent is extended or adjusted under 35 U.S.C. 154(b) by 0 days.

(21) Appl. No.: 09/882,654

(22) Filed: Jun. 15, 2001

(30) Foreign Application Priority Data

Jul. 12, 2000 (DE) .......................................... 100 33 851

(51) Int. Cl.$^7$ .............................................. C08L 75/00
(52) U.S. Cl. ....................... 524/589; 524/590; 524/591; 524/839
(58) Field of Search ................................ 524/589, 590, 524/591, 839

(56) References Cited

U.S. PATENT DOCUMENTS 5,672,653 A * 9/1997 Frisch et al.
5,965,195 A   10/1999 Müller et al.

FOREIGN PATENT DOCUMENTS

| FR | 2 776 662 A1 * | 1/1999 |
| FR | 2 776 662 A1 | 10/1999 |
| JP | 4323292 | 11/1992 |

* cited by examiner

Primary Examiner—Edward J. Cain
(74) Attorney, Agent, or Firm—ProPat, L.L.C.

(57) ABSTRACT

Storage-stable polyurethane dispersions preparable by reacting polydienes A which carry at least two isocyanate-reactive groups, polyols B which carry at least one acid group, polyfunctional isocyanates C and chain extenders D, wherein the acid groups of the polyols B are neutralized to a fraction of from 60 to 95%, processes for preparing them, and their use for producing elastic coatings.

11 Claims, No Drawings

AQUEOUS POLYURETHANE DISPERSIONS CONTAINING POLYBUTADIENE UNITS

FIELD OF THE INVENTION

The invention relates to aqueous polyurethane dispersions which contain polybutadiene units and are obtainable by reacting polyfunctional isocyanates, functionalized polybutadienes and functionalized hydrophilic agents, the functional groups of the two last-mentioned reactants reacting with isocyanates and, in doing so, forming covalent bonds.

BACKGROUND OF THE INVENTION

For the coating of flexible substrates and for the production of elastic coatings it is desirable to be able to prepare coating films having a low glass transition temperature.

Polyurethane dispersions containing structures derived from polybutadiene are already known. U.S. Pat. No. 5,672,653 describes anionic polyurethane dispersions which are prepared from hydroxy-functional polybutadienes, alone or in combination with other, less hydrophobic polyols, aliphatic isocyanates such as isophorone diisocyanate, for example, and a diol that contains acid groups, such as dimethylolpropionic acid. From these reactants, first of all a prepolymer is prepared which is neutralized with a tertiary amine, the amount of the neutralizing agent added being sufficient to effect neutralization, and first water and then a chain extender are added to this neutralized prepolymer. However, these polyurethane dispersions always contain residues of N-methylpyrrolidone, which is used as solvent and which cannot be removed completely, owing to its low volatility. Combination with less hydrophobic diols results in coatings with inadequate resistance to hydrolysis. Moreover, the stability of the prepolymers formed is unsatisfactory; they have an intrinsically high viscosity and they gel within a short time.

FR-A 2 776 662 set itself the object of remedying these inadequacies. In the first step, the diol containing acid groups is neutralized with the stoichiometric amount of a neutralizing agent, then dissolved in methyl ethyl ketone and reacted with a polyisocyanate and also with a polydiene having terminal hydroxyl groups, the number of isocyanate groups exceeding that of the hydroxyl groups; in the third step, the prepolymer is dispersed in water, and then a chain extender of the diamine type is added and subsequently the solvent is removed. The prepolymer thus obtained, from the second step, is of considerably lower viscosity than that of the aforementioned US document, and does not gel like the latter, but does also exhibit a considerable increase in viscosity to the 24-fold level within a storage time of 14 days. The more volatile solvent, methyl ethyl ketone, can be removed almost completely.

SUMMARY OF THE INVENTION

In the investigations which formed the basis for the present invention it has now been found that the stability of the resultant polyurethane dispersions on storage may be improved still further by only partly neutralizing the diol containing acid groups. By virtue of this improved stability, which extends to the prepolymer, chain extension may be carried out at an increased temperature without the risk of gelling. The heat which is envolved during chain extension, in conjunction with the already higher temperature, enhances distillation of the solvent, so that a lower solvent content and, owing to the simultaneous removal of some of the water, a higher mass fraction of solids may be achieved without the need for additional energy. Despite the higher mass fraction of solids, the resultant dispersions are storage-stable and exhibit no increase in viscosity on storage.

The present invention accordingly provides storage-stable polyurethane dispersions preparable by reacting polydienes A which carry at least two isocyanate-reactive groups, polyols B which carry at least one acid group, polyfunctional isocyanates C and chain extenders D, wherein the polyols B are neutralized to a fraction of from 60 to 95%.

DETAILED DESCRIPTION OF THE PREFERRED EMBODIMENTS

Preferably, the neutralization of the polyols B is performed prior to reaction with the isocyanates C. The fraction of the neutralized acid groups of B is preferably from 65 to 90, in particular from 70 to 85%.

The polydienes A are, in particular, telechelics, i.e., they carry reactive groups at the chain ends. Preference is given to polydienes having two reactive groups selected from hydroxyl groups, amino groups and mercapto groups, these groups reacting with isocyanates to form urethanes, ureas or thiourethanes. They are prepared in particular by free-radically initiated polymerization of aliphatic linear, branched or cyclic compounds having at least two conjugated double bonds and from 4 to 20 carbon atoms. Initiators used are those free-radical initiators which generate, for example, hydroxyl groups at the chain end, such as hydrogen peroxide, or azo compounds such as 2,2'-azobis(2-methyl-N-(2-hydroxyethyl)propionamide). Another means of generating the polydienes is by anionic polymerization, initiated for example with dilithium naphthalene. When the polymerization is terminated, the end group may be selected through an appropriate choice of the terminating agent. Suitable unsaturated hydrocarbons are, in particular, dienes, such as butadiene, isoprene, chloroprene, 1,3-pentadiene and cyclopentadiene, which may also be copolymerized as a mixture. Particular preference is given to polybutadienes having two hydroxyl groups as end groups, especially to those having a number-average molar mass $M_n$ of from about 1000 to 15000 g/mol.

Preferred polyols B containing at least one acid group are dihydroxycarboxylic acids having from 4 to 8 carbon atoms such as bishydroxymethylpropionic acid and bishydroxymethylacetic acid or tartaric acid. Likewise suitable are, for example, dihydroxysulfonic acids such as N,N-bis(2-hydroxyethyl)-2-aminoethanesulfonic acid and N,N-bis(2-hydroxyethyl)-3-amino-2-hydroxypropanesulfonic acid. Instead of the polyols B or in a mixture with them it is also possible to use amines containing at least two primary or secondary amino groups or mercaptans containing at least two mercapto groups and in each case at least one acid group. Examples are diaminocarboxylic acids such as ornithine or dimercaptosulfonic acids such as 2,3-dimercaptopropanesulfonic acid; examples of molecules containing mixed isocyanate-reactive groups are serine (—OH and —NH$_2$) and cysteine (—SH and —NH$_2$).

The polyfunctional isocyanates C are preferably aliphatic linear, branched and cyclic isocyanates such as 1,4-tetramethylene diisocyanate, 1,6-hexamethylene diisocyanate (HDI), 2,2,4- and 2,4,4-trimethylhexane diisocyanate, dodecamethylene diisocyanate, 1,4-diisocyanatocyclohexane, 1-isocyanato-3,3,5-trimethyl-5-isocyanatomethylcyclohexane (isophorone diisocyanate, IPDI) and bis(4-isocyanatocyclohexyl)methane (HMDI). It is also possible to use those mixed aromatic-aliphatic isocyanates in which the isocyanate group is attached to aliphatic carbon atoms, such as tetramethylxylylene diisocyanate, for example. Likewise suitable are the allophanates formed by partial reaction with alcohols and subsequent addition, and the biurets formed by partial reaction with water and subsequent addition, and also the isocyanurates formed by trimerization and the adducts formed by reaction with polyhydric alcohols such as trimethylolpropane, for example. Less preferred, though likewise suitable for the invention, are aromatic isocyanates, provided they are used in a mixture with the preferred (cyclo)aliphatic isocyanates; especially diisocyanates such as 4,4'-diphenylmethane diisocyanate (MDI), 2,4- and 2,6-tolylene diisocyanate and their technical mixtures (TDI), and also 1,3- and 1,4-phenylene diisocyanate, diisocyanatonaphthalene and triphenylmethane triisocyanate, and also the isocyanurates, uretdiones, allophanates and biurets derived from these isocyanates.

Suitable chain extenders D are compounds containing at least two isocyanate-reactive hydrogen atoms which in aqueous solution or dispersion react faster with the isocyanate than water. They include, in particular, amines containing at least two primary or secondary amino groups or at least one primary and at least one secondary amino group, and also dimercaptans and aminomercaptans containing a primary or secondary amino group. Preference is given to linear and branched aliphatic diamines having from 2 to 9 carbon atoms, such as ethylenediamine, 1,4-diaminobutane, 1,6-diaminohexane, 2,2,4- and 2,4,4-trimethyl-1,6-diaminohexane and neopentanediamine.

Solvents which may be used include in particular those organic compounds which have sufficient dissolution power and a boiling temperature of below about 120° C., and which do not themselves react with isocyanates. Preference is given to ketones such as acetone, methyl ethyl ketone, methyl isopropyl ketone and diethyl ketone. It is likewise possible to use esters of aliphatic alcohols with (aliphatic) carboxylic acids, such as ethyl acetate, isopropyl acetate, propyl acetate, isobutyl acetate, and dimethyl carbonate.

The polyurethane dispersions of the invention are prepared by introducing a mixture of the polydienes A and the polyols B, containing acid groups, in an inert solvent and heating this initial charge to the desired reaction temperature of from 30 to 100° C., preferably from 50 to 90° C., and in particular from 60 to 80° C. The neutralizing agent for component B is added together with it, or else first a solution of component A in the solvent is prepared, the neutralizing agent is added to this solution, and only then is the polyol B added. The amount of the neutralizing agent is such that from 60 to 95% of the acid groups of the polyol B, preferably from 65 to 90, with particular preference from 70 to 85% of the acid groups, are neutralized. Subsequently, at the reaction temperature referred to above, the isocyanate C is added to the solution of the neutralized polyol B and polydiene A. This is generally accompanied by a further increase in the reaction temperature. The reaction mixture is then left at the chosen temperature with thorough mixing until the desired degree of polymerization (determined by way of the Staudinger Index $J_0$ of the prepolymer formed) has been reached. The prepolymer is then dispersed in water, wherein it is possible either (preferably) to add water to the resin solution or contrawise (less preferably) to stir the resin solution into water. It is preferred to heat the water to the reaction temperature or to a temperature of not more than 20° C. below the reaction temperature, i.e. to a temperature of from about 60° C. to about 95° C. Removal of the azeotropic mixture comprising water and the solvent by distillation is preferably started during this mixing operation. As soon as mixing is complete (i.e., as soon as the total amount of water has been stirred homogeneously into the resin solution or all of the resin solution has been stirred homogeneously into the water), the chain extender D is added. Reaction of the chain extender with the isocyanate groups still present in the prepolymer results in a further heating, which assists distillation of the azeotrope. The reaction mixture is then heated further until all of the solvent used has been removed by distillation, to leave a dispersion of the resulting polyurethane in water. By adding more water or by continuing distillation it is possible to adjust the mass fraction of solids to the desired value (preferably about 50% or more).

The dispersions of the invention may be used in particular as binders for physically drying clearcoats and matt coatings. Coatings compositions are prepared by mixing the polyurethane dispersion of the invention with one or more of additives such as levelling agents, fillers and extruders, pigments, etc. After drying, they form tough, flexible films featuring good scratch resistance, mechanical stability, and low water absorption. Because of their high level of toughness and high tear propagation resistance, in conjunction with the adhesion-exceeding cohesion, the films thus formed may be removed as a whole from substrates coated with them. Thicker coatings produced by repeated successive application have no propensity toward delamination. The good chemical and physical resistance is of particular advantage.

The examples below illustrate the invention.

EXAMPLES

Example 1

302.3 g of polybutadienediol (®PolyBD R45HT, Atofina) were charged to a 2 l glass flask and dissolved in 340 g of methyl ethyl ketone (MEK). 9.5 g of triethylamine and 17.9 g of dimethylolpropionic acid were added to this mixture and dissolved. The mixture was heated to 70° C.

At this temperature, 89.9 g of isophorone diisocyanate were added to the clear solution. The temperature of the mixture increased to 80° C. This temperature was maintained until the Staudinger Index $J_0$ (intrinsic viscosity) of the polyurethane, measured in a solution of methyl ethyl ketone and chloroform at 20° C., with dilution first to a concentration of 50 g in 100 g of solution, by addition of methyl ethyl ketone, and then to a concentration of 1 g in 100 g of solution, by addition of chloroform, had reached a value of 24.5 cm$^3$/g. The resin solution was then dispersed in 708 g of water, heated beforehand to 80° C., within 5 to 10 minutes. Removal of the resulting MEK/water azeotrope by distillation was started during dispersion. Straight after the end of the addition of water, a solution of 6.8 g of ethylenediamine in 60 g of water was metered in over the course of about 5 minutes. This was accompanied by warming leading to an increase in the temperature by about 3 to 4° C., which greatly promoted the distillation of the azeotrope. Distillation was then continued with gentle heating until a total of 340 g of MEK and 360 g of water had been removed. Cooling to room temperature gave a whitish opaque dispersion having a mass fraction of solids of about 50% and a viscosity of from about 500 to 1000 mPa.s. The pH of this dispersion was about 7.5.

The dispersion prepared in accordance with the invention had an excellent storage stability and, over a storage period of up to 28 days, showed no increase in viscosity and no gelling. The viscosity of the dispersion immediately after preparation was about 700 mPa.s; the figure measured was after 7 days about 600 mPa.s, after 14 days about 550 mPa.s, and after 28 days about 560 mPa.s.

EXAMPLE 2

(Comparative Example, in Accordance with the Application FR 2776662, Ex. A)

In a 2 l glass flask, 11.1 g of dimethylolpropionic acid, 8.4 g of triethylamine, 0.4 g of dibutyltin dilaurate and 200 g of methyl ethyl ketone were mixed until a clear solution had formed. 243 g of ®PolyBD R 45 HT, which before being added had been freed from dissolved gases under reduced pressure (5 mbar=5 hPa=500 Pa) at 80° C. for one hour, were cooled to about 40° C. and this mass was then added to the solution of dimethylolpropionic acid, triethylamine and methyl ethyl ketone plus catalyst prepared in the first step, together with a further 290 g of the MEK solvent. 64.2 g of isophorone diisocyanate were then added to the homogenized mixture, which was heated until the MEK solvent boiled. The reaction mixture was held at this temperature for 4 hours.

The prepolymer formed has a low viscosity of about 30 mPa.s immediately after preparation; in the course of storage there is a marked rise in the viscosity, which reaches about 85 mPa.s after one week and about 735 mPa.s after 2 weeks.

The prepolymer was added dropwise with thorough stirring over 90 minutes to an initial charge of 247 g of water at room temperature. This was followed by the dropwise addition of 1.93 g of hydrazine hydrate, again with thorough stirring; stirring was continued for about 5 minutes. The MEK solvent was removed by distillation under reduced pressure on a rotary evaporator; the dispersion that remained was filtered through a filter cloth (100 μm pore size). The resulting dispersion had a mass fraction of solids of about 35%.

Results of the comparison: The polyurethane dispersions in accordance with the present invention may be prepared with a significantly higher mass fraction of solids without problems due to viscosity increase or sedimentation occurring in the course of storage. In accordance with the invention, diamines may be used as chain extenders instead of the (toxic) hydrazine. If, in comparative example 2, the hydrazine hydrate is replaced by ethylenediamine, the resulting dispersion tends to gel, even at the lower mass fraction of solids.

What is claimed is:

1. A storage-stable polyurethane dispersion obtained by reacting polydienes A which carry at least two isocyanate-reactive groups, polyols B which carry at least one acid group, polyfunctional isocyanates C and chain extenders D, wherein the acid groups of the polyols B are neutralized to a fraction of from 60 to 95%.

2. The storage-stable polyurethane dispersion as claimed in claim 1, wherein polydienes containing at least two hydroxyl groups are used as component A.

3. The storage-stable polyurethane dispersion as claimed in claim 1, wherein polydienes containing units derived from butadiene, isoprene, 1,3-pentadiene, chloroprene and/or cyclopentadiene are used as component A.

4. The storage-stable polyurethane dispersion as claimed in claim 1, wherein polybutadiene diols are used as component A.

5. The storage-stable polyurethane dispersion as claimed in claim 1, wherein diols containing at least one acid group are used as component B.

6. The storage-stable polyurethane dispersion as claimed in claim 1, wherein aliphatic linear, branched or cyclic isocyanates containing at least two isocyanate groups per molecule are used as component C.

7. A process for preparing storage-stable polyurethane dispersions by reacting polydienes A which carry at least two isocyanate-reactive groups, polyols B which carry at least one acid group, and polyfunctional isocyanates C to give a prepolymer, dispersing this prepolymer in water and then reacting it with chain extenders D, wherein the acid groups of the polyols B are neutralized to a fraction of from 60 to 95%.

8. The process as claimed in claim 7, wherein the neutralization of the acid groups of the polyol B is performed prior to the addition of the isocyanates C.

9. The process as claimed in claim 7, wherein the prepolymer is dispersed in water with a temperature of from 60 to 95° C.

10. A methof of use of the aqueous polyurethane dispersion as claimed in claim 1, comprising mixing the polyurethane dispersions with one or more of additives, fillers, extruders, and pigments.

11. An elastic coating prepared by coating rigid or flexible substrates with coating compositions comprising an aqueous polyurethane dispersion as claimed in claim 1.

* * * * *